(12) United States Patent
Jha et al.

(10) Patent No.: US 7,771,679 B2
(45) Date of Patent: Aug. 10, 2010

(54) PROCESS FOR THE RECOVERY OF TITANIUM DIOXIDE FROM TITANIUM-CONTAINING COMPOSITIONS

(75) Inventors: Animesh Jha, Leeds (GB); Vilas Dattatray Tathavadkar, Phaltan (IN)

(73) Assignee: The University of Leeds, Leeds (GB)

( * ) Notice: Subject to any disclaimer, the term of this patent is extended or adjusted under 35 U.S.C. 154(b) by 216 days.

(21) Appl. No.: 10/571,038

(22) PCT Filed: Sep. 14, 2004

(86) PCT No.: PCT/GB2004/003925

§ 371 (c)(1),
(2), (4) Date: Dec. 22, 2006

(87) PCT Pub. No.: WO2005/028369

PCT Pub. Date: Mar. 31, 2005

(65) Prior Publication Data

US 2007/0110647 A1      May 17, 2007

(30) Foreign Application Priority Data

Sep. 18, 2003  (GB) ................... 0321845.0
Jun. 11, 2004  (WO) ............... PCT/GB2004/002543

(51) Int. Cl.
  $C01G\ 23/00$    (2006.01)
(52) U.S. Cl. ................. 423/80; 75/10.25; 75/10.26; 423/598; 423/610; 423/82; 423/84

(58) Field of Classification Search ............... 423/122, 423/131, 610, 80, 82, 84; 75/10.18, 10.25, 75/435; $C01G\ 23/047$
See application file for complete search history.

(56) References Cited

U.S. PATENT DOCUMENTS

| | | | | |
|---|---|---|---|---|
| 1,911,396 | A | * | 5/1933 | Saklatwalla et al. ........... 423/71 |
| 2,109,917 | A | * | 3/1938 | Dunn .......................... 423/82 |
| 3,069,235 | A | * | 12/1962 | Schechter et al. ............. 423/84 |
| 3,733,193 | A | * | 5/1973 | Dresher et al. ............... 423/68 |
| 4,038,363 | A | * | 7/1977 | Jarish .......................... 423/82 |
| 5,085,837 | A | * | 2/1992 | Chao et al. .................... 423/82 |
| 5,411,574 | A | * | 5/1995 | Turney et al. ................. 75/743 |
| 5,527,469 | A | * | 6/1996 | Lawhorne et al. ........... 210/710 |
| 5,595,347 | A | * | 1/1997 | Walpole ...................... 241/20 |
| 6,346,223 | B2 | | 2/2002 | De Matos et al. |
| 6,471,743 | B1 | * | 10/2002 | Young et al. .................. 75/739 |
| 2001/0007646 | A1 | * | 7/2001 | Lakshmanan et al. ....... 423/139 |

FOREIGN PATENT DOCUMENTS

WO  WO 02/10068 A  2/2002

OTHER PUBLICATIONS

International Search Report dated Jan. 25, 2005.

* cited by examiner

Primary Examiner—Steven Bos
Assistant Examiner—Richard M Rump
(74) Attorney, Agent, or Firm—Foley Hoag LLP

(57) ABSTRACT

The present invention seeks to improve beneficiation of a titanium oxide-containing composition (such as a low-grade or highly radioactive $TiO_2$ ore) by combining a roasting and selective leaching steps.

30 Claims, 3 Drawing Sheets

X-ray elemental dot map of grain A

BSE (150x)

PROCESS FOR THE RECOVERY OF TITANIUM DIOXIDE FROM TITANIUM-CONTAINING COMPOSITIONS

RELATED APPLICATIONS

This application claims the benefit of priority to Patent Cooperation Treaty Application number PCT/GB2004/003925, filed Sep. 14, 2004; which claims the benefit of priority to Great Britain Patent Application serial number 03218450.0, filed Sep. 18, 2003; and Patent Cooperation Treaty Application number PCT/GB2004/002543, filed Jun. 11, 2004. The entirety of each of them is hereby incorporated by reference.

The present invention relates to a process for recovering titanium dioxide from a titanium oxide-containing composition such as an ore.

Existing supplies of ilmenite and natural rutile are coming under pressure due to a steady growth in $TiO_2$ markets and a rise in demand for high-grade ores for direct chlorination or for the production of synthetic rutile. The new beach sand/placer deposits are of variable quality and many are unsuitable for upgrading and beneficiation using existing commercial processes (Nameny '*Challenges and Opportunities in the $TiO_2$ Feedstock Industry*', AJM Global Mineral Sands Exploration and Investment Conference, Melbourne, 2003).

Most $TiO_2$-ores have high concentrations of zircon and monazite minerals due to their geological proximity. The zircon and monazite impurities in the feedstock reduce its market value. Actinide and lanthanide impurities create operational problems (eg high chlorine consumption or sticky beds) and generate hazardous waste with high concentrations of actinides, lanthanides and other heavy metals. Due to stringent environmental regulations in many countries, the treatment and disposal of such hazardous waste from pigment industries has become a major problem which is increasing the cost of waste treatment and management.

Conventional processes for beneficiation of $TiO_2$ ores are
 a) physical processes such as gravitational, magnetic and electrical separation which are used to separate the magnetite, monazite, zircon and other siliceous gangue and
 b) chemical processes, namely acid leaching and $TiO_2$-slag formation (high temperature reduction) which are mainly used to remove iron (Becher, Benilite, Austpac).

However, these processes require high quality ilmenite ores. If used for beneficiation of low grade/highly radioactive $TiO_2$-ores, the level of critical impurities such as $Cr_2O_3$, $V_2O_5$, $Nb_2O_5$ (which degrade the pigment properties) and CaO and $SiO_2$ (which create operational problems such as sticky beds) is very high in the end product. Also solute impurities (Fe, Nb, U, Th, Ce) in the $TiO_2$ phases (pseudorutile, ilmenite, anatase) remain in the feedstock and end up in the waste stream of the pigment manufacturing process (chlorination or sulphatation). The slagging process (which is the main source of feedstock for pigment manufacturing) separates only iron oxides and most of the other impurities enter the feedstock eg in the $TiO_2$-slags. The slagging process is also facing uncertainty due to its high power consumption and emission of greenhouse gas.

In view of the changing sources (deposits) of $TiO_2$ ores and environmental concerns in relation to the disposal of waste, there is a need for a more environmentally acceptable approach to the beneficiation of $TiO_2$. There have been a number of investigations into the roasting of ilmenite with soda, mainly in a reducing atmosphere with carbon (ed Fathi Habashi, *Handbook of Extractive Metallurgy*, Vol. II, Publ.: Wiley-VCH, Berlin, 1997). However the yield of $TiO_2$ in this technique is not very high (<90 wt %). The major drawback of this process is that neither is iron separated in the metallic form nor is a leachable product produced (*Handbook of Extractive Metallurgy* [supra]). A limited number of investigations have been carried out on oxidative alkali roasting techniques. However the yield of $TiO_2$ and separation out of actinides and lanthanides is below the required levels for chlorination (U.S. Pat. No. 6,346,223).

The present invention seeks to improve beneficiation of a titanium oxide-containing composition (such as a low-grade or highly radioactive $TiO_2$ ore) by combining roasting and selective leaching steps. In particular, the present invention relates to a beneficiation process for separation of non-lanthanide (eg Fe, Ca, Si, V and Cr), pre-lanthanide (eg Zr and Nb), lanthanide (eg Ce and Nd) and actinide (eg U and Th) impurities from titaniferous deposits.

Viewed from a first aspect the present invention provides a process for recovering a titanium dioxide product from a titanium oxide-containing composition comprising:

(a) providing the titanium oxide-containing composition with one or more alkali salts and with at least one of an alumina-containing material and a calcium oxide-containing material to produce a charge;

(b) oxidatively roasting the charge to produce a roasted mass; and (c) recovering the titanium oxide product from the roasted mass.

The process of the invention may successfully upgrade a wide range of titanium oxide-containing compositions and produce a high purity titanium oxide product (preferably synthetic rutile) for direct use in pigment production (chlorination and sulphatation). By roasting in the presence of an alumina-containing material or a calcium oxide-containing material, the process of the invention may achieve a complete, efficient and economical separation out of large concentrations of iron oxides and lanthanide and actinide impurities which otherwise contribute to the feedstock in pigment production. The addition of an alumina-containing material or a calcium oxide-containing material helps to remove not only zircon and monazite minerals but also lanthanide and actinide impurities (solute) present in the lattice of the $TiO_2$ phases (rutile, pseudorutile, brookite, etc). In certain embodiments, the process also recovers metal values as value-added byproducts and alkali salts thereby substantially reducing the amount of waste and usage of raw materials (namely alkali salt and alumina) which can be recycled to make the process economically viable.

By "titanium oxide-containing composition" is meant a mixture of metal oxide species in compound form or forms which include titania ($TiO_2$). The titanium oxide-containing composition may be synthetic or (preferably) natural such as a powder, ore or mineral or a mixture thereof. Preferred is a titanium rich material such as an ore (eg ilmenite, anatase, ilmenite beach sands, low grade titaniferrous slag, natural rutile or perovskite). Preferred are titaniferrous mixtures which further include at least one iron species such as a ferrous or ferric species (preferably an iron oxide such as FeO, $Fe_2O_3$ or $Fe_3O_4$). The titaniferrous mixture may further comprise alumina or silica. The titanium oxide-containing composition may be a residue from a chlorination or sulphatation process.

Preferably the mineral ores are selected from the group consisting of ilmenite, anatase and perovskite.

Preferably the mineral ore is a mixture of ilmenite and perovskite.

Preferably the one or more alkali salts is one or more alkali metal or alkaline earth metal salts. Preferably the one or more alkali salts is one or more carbonates, hydroxides, bicarbonates or sulphates of a group IA or group IIA metal or a mixture thereof. For example, the one or more alkali salts may be selected from the group consisting of $Na_2CO_3$, $K_2CO_3$, $Na_2SO_4$, $K_2SO_4$, NaOH, $NaHSO_4$, $KHSO_4$, $KHCO_3$, $NaHCO_3$ and KOH. Sodium and/or potassium carbonate are preferred. The amount of alkali salt may be calculated based on the formation of alkali compounds of $TiO_2$, $Fe_2O_3$, $Al_2O_3$, $SiO_2$, and $P_2O_5$ present in the composition (eg ore).

Preferably step (a) comprises: providing the titanium oxide-containing composition with one or more alkali salts and with an alumina-containing material and a calcium oxide-containing material.

Step (b) may be carried out at a temperature in the range 500° C. to 1000° C., preferably 700° C. to 975° C., more preferably 700° C. to 875° C. (eg about 800° C.) in air or another source of oxygen. Step (b) may be carried out in a conventional rotary kiln or a rotary hearth furnace. Step (b) may be carried out for a suitable length of time (eg 120 minutes).

Step (b) generally forms alkali titanates and complex oxide salts.

Step (a) typically includes mixing (eg homogeneously mixing) the titanium oxide-containing composition with one or more alkali salts and with at least one of the alumina-containing material and the calcium oxide-containing material to produce the charge. The alumina-containing material or calcium oxide-containing material may undergo controlled addition to the titanium oxide-containing composition.

Preferably the alumina-containing material (eg alumina) is present in the charge in an amount in the range 5 to 30 wt % of the titanium oxide-containing composition, preferably 10 to 25 wt % of the titanium oxide-containing composition, more preferably 15 to 22 wt % (eg about 20 wt %) of the titanium oxide-containing composition. The precise amount of alumina-containing materials in the charge generally depends on the ratio of titanium oxide-containing composition:alkali salt, formation of liquid phase and the concentration of various impurities (mainly iron oxides, silicates and phosphates). The alumina-containing material may be alumina, aluminum hydroxide, $Al_2O_3$-containing clay or a mixture thereof. An aluminate (eg $NaAlO_2$) may also be used. During step (b), alumina along with other gangue phases in the titanium oxide-containing composition react with the alkali salt and form complex oxide phases (such as Na—Al—Si-M-O phases) which increase the solubility and stability of ferrites such as sodium ferrite. This complex salt phase thereby helps to separate out iron oxides from the titanium oxide-containing composition.

The calcium oxide-containing material may be lime (ie CaO or $Ca(OH)_2$), calcium oxide (eg calcite) or a mixture thereof. Preferably the calcium oxide-containing material (eg CaO) is present in the charge in an amount in the range 0.1 to 5 wt % of the titanium oxide-containing composition, preferably 1 to 4 wt % of the titanium oxide-containing composition, more preferably 2 to 3 wt % of the titanium oxide-containing composition. The addition of the calcium oxide-containing material is on the basis of the formation of perovskite and pyrochlore-type phases of $TiO_2$ and $ZrO_2$ which can dissolve high concentrations of inter alia rare earth elements REEs (eg U or Th) and Nb (De Hoog et al, Mineralogical Magazine, 61, 721-725, 1997). During step (b), CaO reacts with $TiO_2$ and zircon minerals and forms various Ca—Na—Ti-M-O compounds such as perovskite ($CaTiO_3$), zirconolite $[(Ca,Fe,Y,Th)_2(Fe,Ti,Nb)_3Zr_2O_7]$ and hiarneite $[(Ca,Mn,Na)_2(Zr,Mn)_5(Sb,Ti,Fe)_2O_{16}]$ which advantageously absorb most of the lanthanide and actinide impurities in the monazite and zircon minerals. The solute impurities in the $TiO_2$-rich phases diffuse outward towards the $CaTiO_3$ formed on the surface of $TiO_2$ grains.

Step (c) may comprise:

(c1) adding to the roasted mass an aqueous medium to produce an aqueous solution and a substantially insoluble residue.

The aqueous medium may be water or an alkali solution (eg a dilute alkali solution). Typically water is used at an elevated temperature. The hot water may be at a temperature in the range 70 to 90° C. Step (c1) may be carried out in hot water for 20 to 200 minutes, preferably 25 to 100 minutes (eg 40 minutes).

In step (c1), water-soluble alkali compounds such as metal (eg sodium) aluminate, silicate, chromate, vanadate and phosphate may be dissolved in the aqueous solution. Aqueous medium may be added repeatedly to wash the substantially insoluble residue (typically until the pH of the washings reaches about 7).

Preferably step (c1) comprises:

(c1a) adding water at an elevated temperature to the roasted mass to produce an aqueous solution and a substantially insoluble residue;

(c1b) adding to the aqueous solution a source of alkalinity to enhance the selective separation of a fine precipitate.

The fine precipitate generally comprises fine particles of titanium oxide-containing composition (eg ore) and constituents of complex alkali salts (eg Na—Al—Si—Fe-M-O) which precipitate as oxides or hydroxides of Fe, Nb, Al or RREs (eg U and Th) due to their limited solubility. The fine precipitate may be separated from the aqueous solution by standard techniques such as filtration.

The source of alkalinity is preferably an ammonium salt such as a carbonate, sulphate, bisulphate or bicarbonate. Typically the ammonium salt is added in an amount up to 5 wt % to optimize precipitation kinetics.

Preferably the process further comprises:

(d) recovering metal values from the fine precipitate.

In step (d), the metal values may be selected from the group consisting of alumina-containing material (eg alumina), calcium oxide-containing material (eg CaO) and metal oxides (eg iron oxide such as $Fe_2O_3$ or niobium oxide such as $Nb_2O_5$).

Preferably the process further comprises:

(e) recovering metal values from the aqueous solution.

In step (e), the metal values may be selected from the group consisting of alkali salt, alumina-containing material (eg alumina), calcium oxide-containing material (eg CaO) $V_2O_5$, $Fe_2O_3$ and $Cr_2O_3$. Oxides of Nb, Ta, Zr and RREs may also be recovered (eg NbO, $ZrO_2$, $U_3O_8$, $UO_2$, $UO_3$, $ThO_x$).

Preferably step (e) comprises:

(e1) acidifying the aqueous solution.

Step (e1) may be performed by the addition of a weak acid. Typically the acid is an inorganic acid (eg an inorganic acid selected from the group consisting of hydrofluoric acid, hydrochloric acid, nitric acid, sulphuric acid, an acidic oxide and mixtures thereof). Step (e1) may be better controlled by using a weak organic acid such as formic, oxalic or acetic acid and/or $CO_2$. Preferably the acid is an acidic oxide, particularly preferably carbon dioxide. For example, step (e1) may include: bubbling $CO_2$ gas through (or passing oxalic acid into) the aqueous solution. The addition of weak acid and/or $CO_2$ provides precise control of pH for selective precipitation of oxides. The use of an acid with $CO_2$ also helps precipitation coarsening kinetics and therefore reduces the entrapment of small particles of impurity oxides with coarser $TiO_2$-rich particles in the coarse residue.

By recovering metal values as value-added byproducts and alkali salts in steps (d) and (e), the amount of waste and usage of raw material (namely alkali carbonate and alumina) is reduced to make the process economically viable.

Step (c) of the process preferably further comprises:

(c2) acid leaching the substantially insoluble residue to produce an acid leachate and a solid residue consisting essentially of titanium oxide.

Step (c2) may be carried out in an acid solution, preferably an inorganic acid solution (such as a 2-10% mineral acid (eg HCl, $HNO_3$ or $H_2SO_4$) solution). An example of a suitable acid is 5% HCl. Preferably the acid is at an elevated temperature (eg 70-90° C.). Step (c2) may be carried out for 5 to 200 minutes, preferably 5 to 100 minutes (eg 10 minutes). The concentration of acid and solid-to-liquid ratio are generally based on the amount of insoluble salts of $Fe_2O_3$, $SiO_2$ and CaO compounds in the substantially insoluble residue from step (c1). The solid residue may be separated from the acid leachate by standard techniques such as filtration.

In step (c2), acid-soluble salts of inter alia Nb, Zr and REEs (eg U and Th) may be dissolved in the acid leachate. Alkali titanates are decomposed to $TiO_2$. Dilute acid (and optionally then water) may be added repeatedly to wash the solid residue.

Preferably step (c2) comprises:

(c2a) recovering metal values from the acid leachate.

In step (c2a), the metal values may be selected from the group consisting of acidic compounds, alkali compounds and oxides. Specific examples are $ZrO_2$, $Nb_2O_5$ and $Th/UO_2$.

Typically the solid residue after step (c2) is $TiO_2$-rich and may comprise 87 wt % or more of $TiO_2$ (dependent upon the fineness of oxides produced in step (e1)), preferably 87-95 wt %. Further purification of the solid residue may be carried out (eg by electrolytic purification techniques or calcining). Calcining may be carried out using alkali bisulphates and bicarbonates to further reduce levels of iron, aluminium, silica, phosphate, lanthanide and actinide to produce whiter grades of synthetic rutile.

Purification and agglomeration of the solid residue may form synthetic rutile with a desired level of purity and particle size distribution. Preferably step (c) of the process further comprises:

(c3) roasting at least a proportion of the solid residue with one or more alkali hydrogen sulphates and/or carbonates to produce a roast.

Preferably step (c3) is carried out at low temperature such as 200-400° C. (eg at about 300° C.) in air or another source of oxygen for 1 to 4 hours. Preferred alkali hydrogen sulphates are $NaHSO_4$ and/or $KHSO_4$. Typically the ratio of $NaHSO_4$ or $KHSO_4$ to solid residue is about 1:1. Typically step (c3) is carried out for 1 hour.

Step (c) of the process preferably further comprises:

(c4) water leaching the roast to produce the titanium oxide product.

Typically water is used in step (c4) at an elevated temperature. The hot water may be at a temperature in the range 70 to 90° C. Step (c4) may be carried out in hot water for 20 to 200 minutes, preferably 25 to 100 minutes (eg 30 minutes). The titanium oxide product may be separated from the water leachate by standard techniques such as filtration. Water and optionally dilute acid solution may be added repeatedly to wash the roast (typically until the pH of the washings reaches about 7).

The titanium oxide product is preferably in the form of synthetic rutile. The process of the invention is capable of achieving $TiO_2$ (synthetic rutile) with a purity of 95 wt % or more.

The titanium oxide product may contain $Fe_2O_3$ of 7.5 wt % or less, preferably 6.5 wt % or less, more preferably 2 wt % or less.

The titanium oxide product may contain $Al_2O_3$ of 2.0 wt % or less, preferably 1.5 wt % or less, more preferably 0.9 wt % or less.

The titanium oxide product may contain $SiO_2$ of 1.5 wt % or less, preferably 1 wt % or less, more preferably 0.75 wt % or less, especially preferably 0.1 wt % or less.

The titanium oxide product may contain U of 250 ppm or less, preferably 200 ppm or less, more preferably 155 ppm or less, especially preferably 50 ppm or less.

The titanium oxide product may contain Th of 750 ppm or less, preferably 600 ppm or less, more preferably 580 ppm or less.

The titanium oxide product may contain Zr of 5500 ppm or less, preferably 2500 ppm or less, more preferably 1000 ppm or less.

The present invention will now be described in a non-limitative sense with reference to the accompanying Examples and Figures in which.

EXAMPLE I

Ilmenite Ore from Australia

Figure 1:
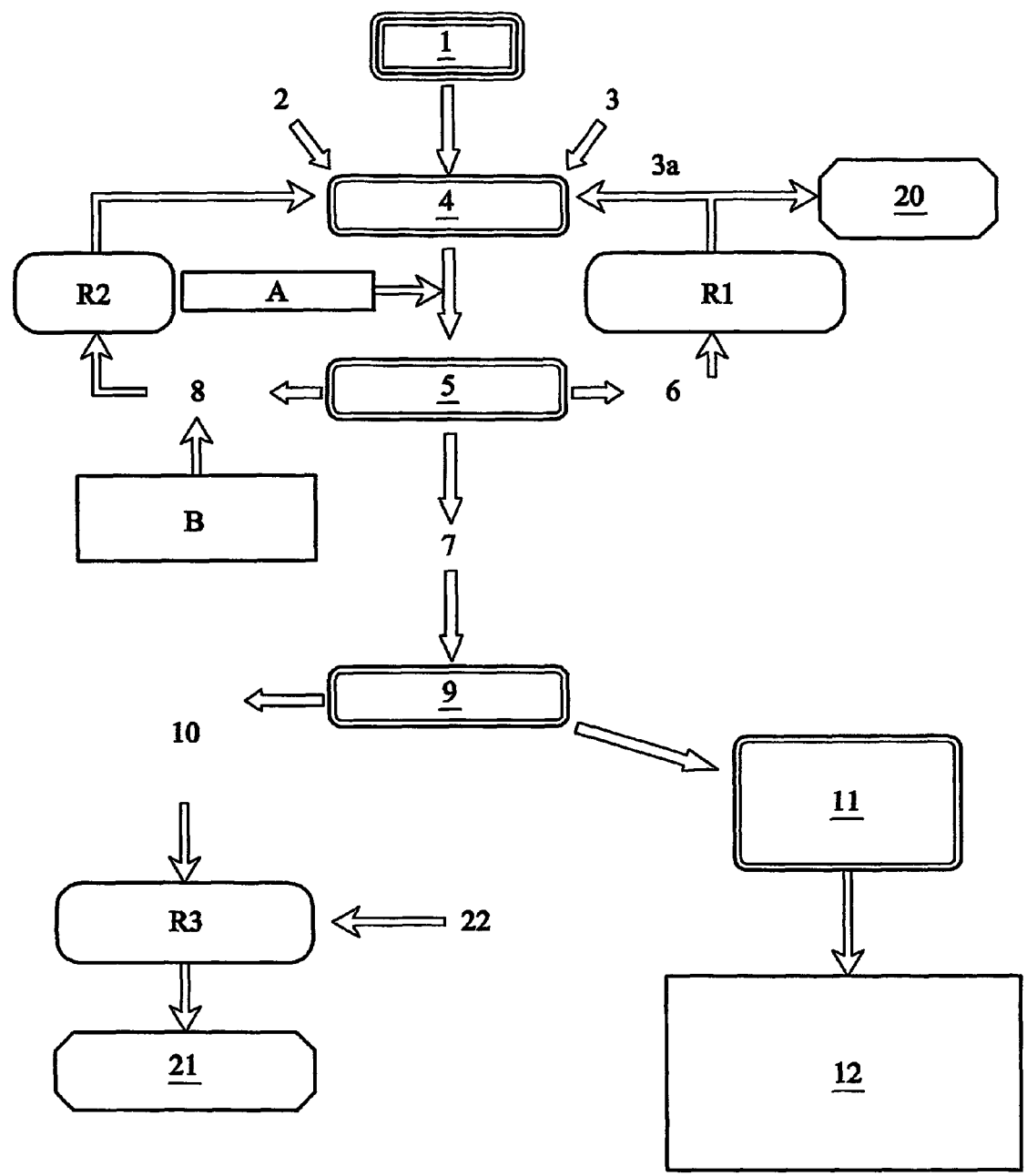
FIG. 1 illustrates a flow chart for beneficiation of a $TiO_2$ ore in accordance with an embodiment of the process of the invention.

In one embodiment of the invention illustrated in FIG. 1, the following steps are involved in the beneficiation of ilmenite ore.

A. Ilmenite ore 1 (analysis given in Table 1) was homogeneously mixed with alkali carbonate (sodium or potassium) 2, alumina (20 wt % of the ore) and CaO (3 wt % of the ore) 3 to produce a charge 4.

B. The charge 4 was roasted in air at 950° C. for 120 minutes to produce a roasted mass.

C. The roasted mass was leached with hot water 5 at 80° C. for 40 minutes. The solution was filtered and a solid coarse residue 7 was leached and washed repeatedly until the pH of the leachate 8 fell to seven.

D. A fine precipitate 6 of ore particles and hydroxides of inter alia Fe, Al, Nb, U, Th and REE was formed during washing and leaching and was separated out by filtration. The pH of the solution may be controlled by adding ammonium salts A for the separation and coarsening of the fine precipitate. The fine precipitate 6 was used for recovery R1 of metal values such as recovered additives 3a and by-products 20 (eg $Fe_2O_3$, $Nb_2O_5$).

E. Alkali salt, alumina, iron oxides/hydroxides and other metal values were recovered R2 from the leachate 8 of step C by $CO_2$ gas bubbling and/or organic acids B.

F. The solid coarse residue 7 from step C was treated with 5% HCl acid solution 9 at 70° C. for 10 minutes. The solution 9 was filtered and a solid residue 11 was thoroughly washed with dilute acid solution and then with water to remove all impurities.

G. The leachate 10 from step F (containing acid soluble salts of inter alia Nb, U, Zr and REE) was treated for recovery R3 of acid and by-products 21 such as $ZrO_2$, $Nb_2O_5$ and $Th/UO_2$.

H. The solid residue 11 from step F was dried in an oven. The analysis of the product (synthetic rutile) is given in Table 1. It may be used for chlorination and the waste 22 from the chlorination plant may be subjected to recovery step R3.

I. A part of the solid residue 11 from step H was roasted with $NaHSO_4$ (1:1 ratio) at 300° C. for 1 hour in air. The ratio of residue 11:$NaHSO_4$ may be increased by carrying out its analysis for the remainder of impurities.

J. The roasted mass from step I was leached with hot water at 80° C. for 30 minutes. The solution was filtered and a further solid residue 12 was leached and washed repeatedly until the pH of the leach solution fell to 7.

K. The further solid residue 12 from step J was dried in an oven. The concentration of $Fe_2O_3$, $Al_2O_3$, and $SiO_2$ in the final product had been reduced considerably to <2 wt %, <0.5 wt % and <0.1 wt % respectively. The purity of synthetic rutile after step J was therefore better than 95%.

In summary, the purity of $TiO_2$ rises from 87% in unoptimized step H to 95% or more after step J.

TABLE 1

Chemical composition of ilmenite ore and final product (synthetic rutile) after step H of the roasting-leaching process of Example I

| Sample/Constituents | Concentration of major constituents in wt % | | | | | | | |
|---|---|---|---|---|---|---|---|---|
| | $TiO_2$ | $Fe_2O_3$ | $Al_2O_3$ | $SiO_2$ | $P_2O_5$ | CaO | $Na_2O$ | LOI* |
| Ore | 70.65 | 21.69 | 2.51 | 2.13 | 0.42 | <0.10 | <0.30 | 2.01 |
| Final Product | 87.81 | 7.45 | 1.23 | 0.90 | 0.01 | 0.22 | 1.30 | 1.01 |

| Sample/Constituents | Concentration of minor constituents in ppm | | | | |
|---|---|---|---|---|---|
| | U | Th | $CeO_2$ | $ZrO_2$ | $Nb_2O_5$ |
| Ore | 470 | 942 | 3814 | 16199 | 200 |
| Final Product | 151 | 576 | 1945 | 9980 | 56 |

Figure 3:
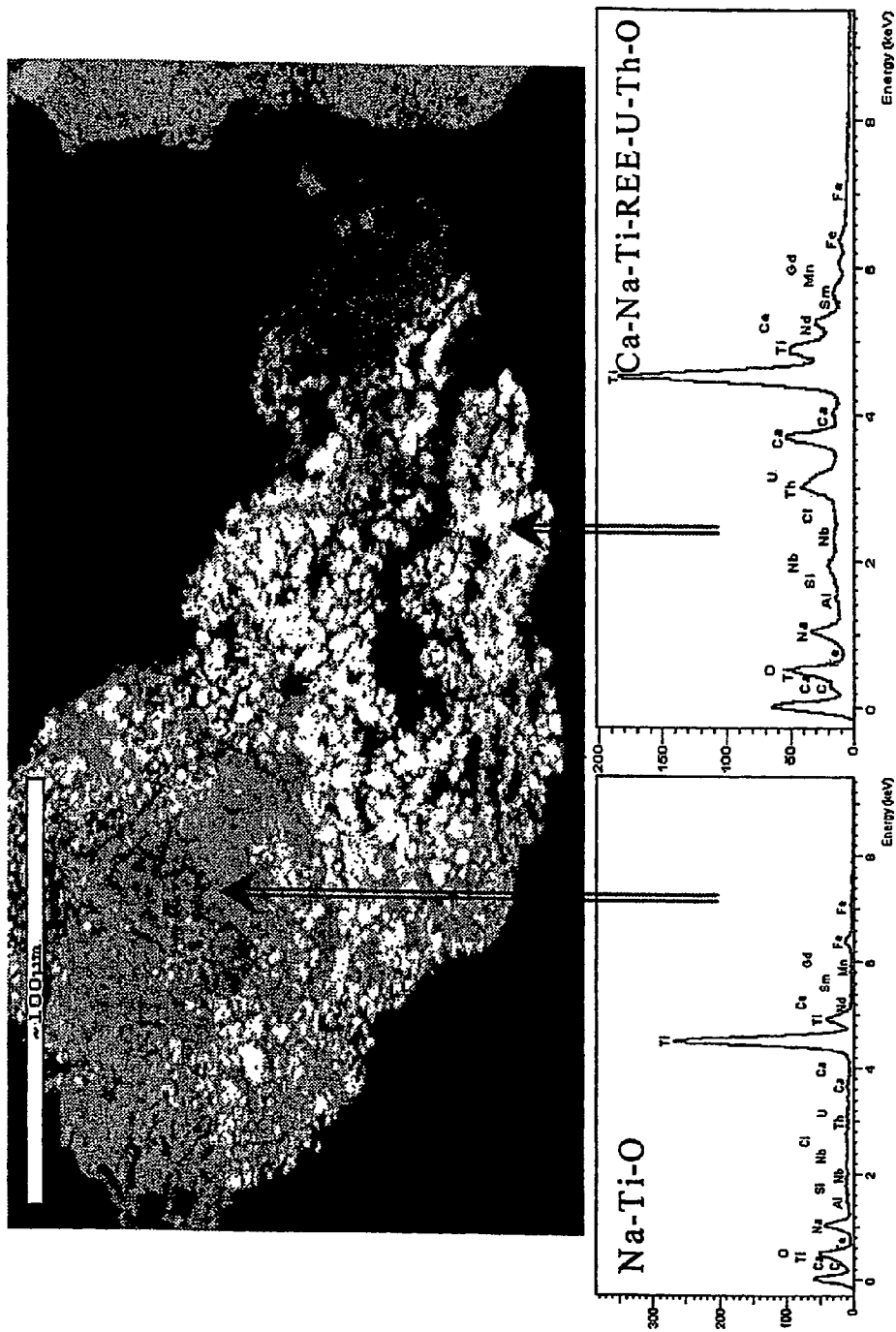
FIG. 3 is the microstructure of rutile grain in ilmenite ore after being subjected to an embodiment of the process of the invention.

FIG. 3 is the microstructure of rutile grain in ilmenite ore after alkali roasting and water leaching. The addition of 5% (with respect to ore) CaO in the roasting charge accelerates the separation from rutile grain (grey colour) of solute impurities as a perovskite phase (bright phase).

EXAMPLE II

Anatase Ore

Anatase ore was subjected to steps identical to those described in Example I. In this case, no extra CaO was added in the roasting charge as ~2 wt % CaO was present in the ore. The chemical analysis of the anatase ore and final product after the roasting and leaching steps is listed in Table 2.

TABLE 2

Chemical composition of anatase ore and final product (synthetic rutile) after the roasting-leaching process of Example II

| Sample/Constituents | Concentration of major constituents in wt % | | | | | | | |
|---|---|---|---|---|---|---|---|---|
| | $TiO_2$ | $Fe_2O_3$ | $Al_2O_3$ | $SiO_2$ | $P_2O_5$ | CaO | $Na_2O$ | LOI* |
| Ore | 57.80 | 14.61 | 7.64 | 1.65 | 7.65 | 2.13 | <0.30 | 6.19 |
| Final Product | 88.39 | 6.01 | 0.84 | 0.74 | 0.30 | 1.17 | 1.13 | 1.20 |

| Sample/Constituents | Concentration of minor constituents in ppm | | | | |
|---|---|---|---|---|---|
| | U | Th | $CeO_2$ | $ZrO_2$ | $Nb_2O_5$ |
| Ore | 194 | 623 | 22779 | 9831 | 6515 |
| Final Product | 36 | 224 | 3868 | 5289 | 0 |

Figure 2:
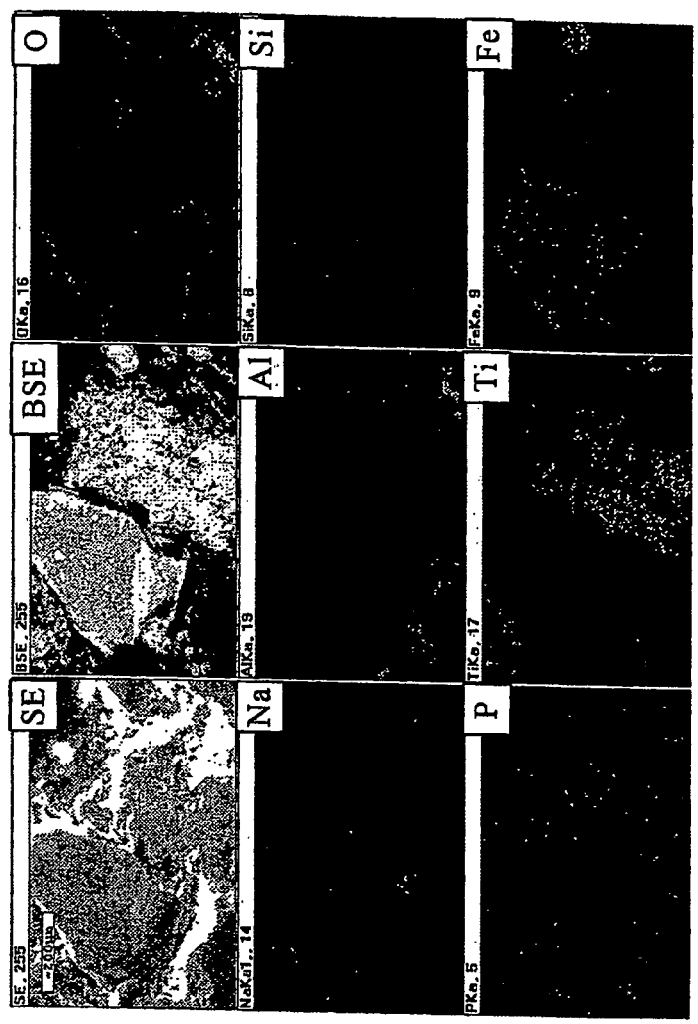
FIG. 2 is a photomicrograph of anatase ore after being subjected to an embodiment of the process of the invention.
Figure 2:
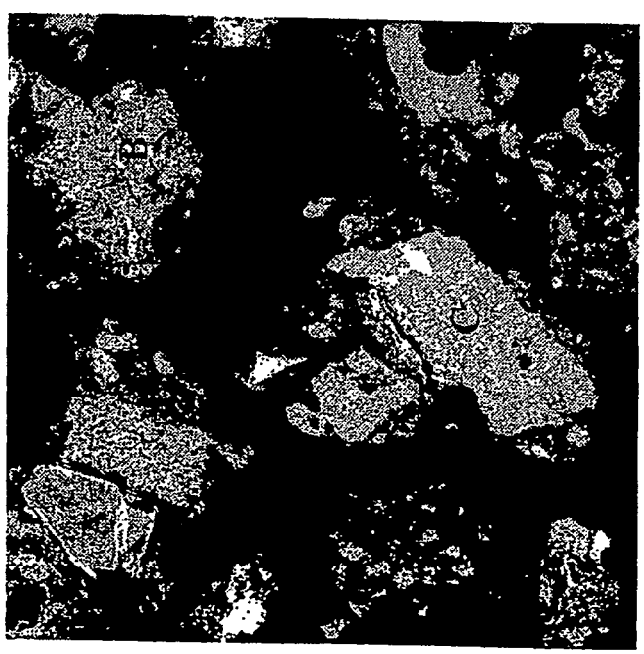

FIG. 2 is a photomicrograph of anatase ore after alkali roasting at 850° C. for 4 hours. The X-ray elemental map of grain A shows the formation of a Na—Al—Fe—Si—O complex phase

The invention claimed is:

1. A process for recovering a titanium dioxide product from a titanium oxide-containing composition comprising: (a) adding to the titanium oxide-containing composition one or more alkali salts and an alumina-containing material to produce a charge; (b) oxidatively roasting the charge at a temperature in the range of 700° C. to 875° C. to produce a roasted mass; and (c) recovering the titanium oxide product from the roasted mass.

2. The process of claim 1, wherein the titanium oxide-containing composition is an ore.

3. The process of claim 1, wherein the titanium oxide-containing composition is a titaniferrous mixture.

4. The process of claim 2, wherein the ore is selected from the group consisting of ilmenite, anatase and perovskite.

5. The process of claim 1, wherein the one or more alkali salts is one or more carbonates, hydroxides, bicarbonates or sulphates of a group Ia or group IIa metal or a mixture thereof.

6. The process of claim 1, wherein the one or more alkali salts is selected from the group consisting of $Na_2CO_3$, $K_2CO_3$, $Na_2SO_4$, $K_2SO_4$, NaOH, $NaHSO_4$, $KHSO_4$, $KHCO_3$, $NaHCO_3$ and KOH.

7. The process of claim 1, wherein the one or more alkali salts is selected from the group consisting of sodium carbonate and potassium carbonate.

8. The process of claim 1, wherein step (a) comprises: providing the titanium oxide-containing composition with one or more alkali salts and with an alumina-containing material and a calcium oxide-containing material.

9. The process of claim 1, wherein the alumina-containing material is selected from the group consisting of alumina, aluminum hydroxide, $Al_2O_3$-containing clay, $NaAlO_2$ and mixtures thereof.

10. The process of claim 8, wherein the calcium oxide-containing material is selected from the group consisting of lime, calcium oxide and mixtures thereof.

11. The process of claim 1, wherein step (c) comprises: (c1) adding to the roasted mass an aqueous medium to produce an aqueous solution and a substantially insoluble residue.

12. The process of claim 11, wherein the aqueous medium is water or an alkali solution.

13. The process of claim 11, wherein the aqueous medium is hot water.

14. The process of claim 11, wherein step (c1) comprises: (c1a) adding water at an elevated temperature to the roasted mass to produce an aqueous solution and a substantially insoluble residue; (c1b) adding to the aqueous solution a source of alkalinity to enhance the selective separation of a fine precipitate.

15. The process of claim 14, wherein the source of alkalinity is an ammonium salt.

16. The process of claim 14, further comprising: (d) recovering metal values from the fine precipitate.

17. The process of claim 16, wherein the metal values are selected from the group consisting of alumina-containing material, calcium oxide-containing material and metal oxides.

18. The process of claim 16, further comprising: (e) recovering metal values from the aqueous solution.

19. The process of claim 18, wherein the metal values are selected from the group consisting of alkali salt, alumina-containing material, calcium oxide-containing material, $V_2O_5$, $Fe_2O_3$ and $Cr_2O_3$.

20. The process of claim 18, wherein step (e) comprises: (e1) acidifying the aqueous solution.

21. The process of claim 20, wherein step (e1) is performed by the addition of a weak organic acid.

22. The process of claim 21, wherein the weak organic acid is formic acid, oxalic acid, acetic acid and/or $CO_2$.

23. The process of claim 11, wherein step (c) further comprises: (c2) acid leaching the substantially insoluble residue to produce an acid leachate and a solid residue consisting essentially of titanium oxide.

24. The process of claim 23, wherein step (c2) comprises: (c2a) recovering metal values from the acid leachate.

25. The process of claim 23, wherein step (c) further comprises: (c3) roasting at least a proportion of the solid residue with one or more alkali hydrogen sulphates and/or carbonates to produce a roast.

26. The process of claim 25, wherein the alkali hydrogen sulphates are $NaHSO_4$ or $KHSO_4$.

27. The process of claim 25, wherein step (c) comprises: (c4) water leaching the roast to produce the titanium oxide product.

28. The process of claim 27, wherein water is used in step (c4) at an elevated temperature.

29. The process of claim 1, wherein the titanium oxide product has a purity of 95 wt % or more.

30. The process of claim 1, wherein the temperature is about 800° C.

* * * * *